United States Patent
Kadowaki

Patent Number: 5,794,067
Date of Patent: Aug. 11, 1998

[54] DIGITAL SIGNAL PROCESSING DEVICE

[75] Inventor: Yukio Kadowaki, Nara-Ken, Japan

[73] Assignee: Ricoh Company, Ltd., Tokyo, Japan

[21] Appl. No.: 536,134

[22] Filed: Sep. 29, 1995

[30] Foreign Application Priority Data

Oct. 3, 1994 [JP] Japan .................... 6-263122

[51] Int. Cl.⁶ ............................................. G06F 15/80
[52] U.S. Cl. ........................... 395/800.35; 395/800.34
[58] Field of Search ........................ 395/800, 800.34, 395/800.35

[56] References Cited

U.S. PATENT DOCUMENTS

| | | | |
|---|---|---|---|
| 5,349,691 | 9/1994 | Harrison | 395/800 |
| 5,392,297 | 2/1995 | Bell | 371/22.6 |
| 5,537,601 | 7/1996 | Kimura | 395/800 |
| 5,630,153 | 5/1997 | Intrater | 395/800.35 |
| 5,652,903 | 7/1997 | Weng | 395/800.35 |

*Primary Examiner*—Eric Coleman
*Attorney, Agent, or Firm*—Cooper & Dunham LLP

[57] ABSTRACT

A digital signal processing device includes: a processing unit which performs basic operations, the processing unit transmitting an instruction signal including an instruction described by an instruction code when a special-function operation is performed; a plurality of functional blocks, each connected to the processing unit, which perform special-function operations in accordance with the instruction signal; a bus which interconnects the processing unit and the respective functional blocks to transmit a data signal and the instruction signal; and a block selecting unit, responsive to a status signal, which transmits an enable signal to at least one of the functional blocks to select the above-mentioned at least one of the functional blocks, so that the selected functional block is enabled to receive the instruction signal via the bus and to perform at least one of the special-function operations in accordance with the instruction signal, thereby generating processed data which is transmitted back to the processing unit.

9 Claims, 6 Drawing Sheets

FIG. I PRIOR ART

| | |
|---|---|
| 0000 | LOAD START ADDRESS |
| 0001 | LOAD MODULO VALUE |
| 0010 | LOAD OFFSET VALUE |
| 0011 | DATA WRITE |
| 0100 | INCREMENT WITH OFFSET |
| 0101 | DECREMENT WITH OFFSET |
| 0110 | MODULO INCREMENT WITH OFFSET |
| 0111 | MODULO DECREMENT WITH OFFSET |
| 1XXX | NO OPERATION |

FIG.6

| 68 | 19 | 16 15 | 0 |
|---|---|---|---|
| | | BASIC OPERATION CONTROL AREA | 70 |

| | |
|---|---|
| 0 0 0 0 | BARREL SHIFTER 4-BIT RIGHT SHIFT |
| 0 0 0 1 | BARREL SHIFTER 3-BIT RIGHT SHIFT |
| 0 0 1 0 | BARREL SHIFTER 2-BIT RIGHT SHIFT |
| 0 0 1 1 | BARREL SHIFTER 1-BIT RIGHT SHIFT |
| 0 1 0 0 | BARREL SHIFTER 1-BIT LEFT SHIFT |
| 0 1 0 1 | BARREL SHIFTER 2-BIT LEFT SHIFT |
| 0 1 1 0 | BARREL SHIFTER 3-BIT LEFT SHIFT |
| 0 1 1 1 | BARREL SHIFTER 4-BIT LEFT SHIFT |
| 1 0 0 0 | MAX PEAK VALUE DETECT |
| 1 0 0 1 | MIN PEAK VALUE DETECT |
| 1 0 1 0 | MAX PEAK VALUE LOAD |
| 1 0 1 1 | MIN PEAK VALUE LOAD |
| 1 1 0 0 | MAX VALUE RESET |
| 1 1 0 1 | MIN VALUE RESET |
| 1 1 1 0 | "1" NORMALIZE |
| 1 1 1 1 | "0" NORMALIZE |

| 19 | 18 | 17 | | 0 |
|---|---|---|---|---|
| 0 | 0 | BASIC OPERATION CONTROL AREA | | |

FIG. 7A

| 19 | 18 | 17 | 14 | 13 | | 0 |
|---|---|---|---|---|---|---|
| 0 | 1 | BLOCK SELECTION AREA | | FUNCTIONAL-BLOCK CONTROL AREA | | |

FIG. 7B 5,794,067

1
DIGITAL SIGNAL PROCESSING DEVICE

BACKGROUND OF THE INVENTION

The present invention generally relates to digital signal processing, and more particularly to a digital signal processing device for performing arithmetic operations, data transfer operations and sequence control operations. The digital signal processing device is adapted to various kinds of units including modem units, sound synthesizers, acoustics processing applications, and data compression and decompression.

FIG. 1 shows a conventional digital signal processor (DSP) 10. In FIG. 1, the digital signal processor 10 has basic units including a memory unit 12, an arithmetic and logic unit (ALU) 14, a sequence controller unit (SCU) 16, and an input/output interface unit (I/O) 18. On the digital signal processor 10, basic signal processing operations, such as multiplication, addition, data transferring and sequence control operations, are performed by the basic units. Hereinafter, the basic signal processing operations are called the basic operations.

The digital signal processor 10 further includes a special-function unit 20. On the digital signal processor 10, a special-function operation, such as a barrel shifting or a normalizing, is performed by the special-function unit 20.

The units 12, 14, 16, 18 and 20 of the above-mentioned processor 10 are interconnected by a system bus 19 including a data bus and a command bus.

When an application program which is run on the digital signal processor 10 is produced by development, it is desirable to optimize the efficiency of the units 12, 14, 16, 18 and 20 to perform operations on the digital signal processor 10. For such a purpose, an optimum combination of specific instructions are selected in accordance with the hardware of the digital signal processor 10 during the development. That is, the combination of the specific instructions is determined in advance of the production of the application program.

When the digital signal processor 10 with the above application program is provided for the user, only the specific instructions in the predetermined combination can be used to run the application program on the digital signal processor 10. For this reason, the user can make use of only application programs that can be effectively run on the hardware of the digital signal processor 10 including the specific instructions in the predetermined combination.

Therefore, it is impossible that the digital signal processor 10 is adapted to some other applications in which special-function operations that are not included in the predetermined combination must be performed.

In addition, there is the need for increasing the processing speed of the digital signal processor 10 to perform operations. A conceivable method for increasing the processing speed to perform operations is to utilize a high-speed digital signal processor which has a high-speed processing unit. However, the cost of the high-speed digital signal processor is high, and the utilization thereof is hardly agreeable to the user.

Accordingly, it is necessary to provide a digital signal processor which can be effectively adapted to various kinds of application software wherein the processing speed is held as high as possible and the cost is reasonably low.

SUMMARY OF THE INVENTION

An object of the present invention is to provide an improved digital signal processing device in which the above-described problems are eliminated.

2

Another object of the present invention is to provide a digital signal processing device which can be adapted to various kinds of signal processing applications and allows the cost of the development of an application program to be reduced.

The above-mentioned objects of the present invention are achieved by a digital signal processing device which includes: a processing unit for performing basic operations including multiplication, addition, data transfer and sequence control operations, the processing unit transmitting an instruction signal, including an instruction described by an instruction, code, when a special-function operation different from the basic operations is performed; a plurality of functional block units, each functional block unit being connected to the processing unit, for performing special-function operations in accordance with the instruction indicated by the instruction signal from the processing unit so that processed data is generated; a bus which interconnects the processing unit and the respective functional block units to transmit the instruction signal from the processing unit to the respective functional block units and transmit a data signal indicating the processed data from the respective functional block units to the processing unit; and a block selecting unit, responsive to a status signal, for transmitting an enable signal to at least one of the functional block units to select at least one of the functional block units, so that the selected functional block unit is enabled to receive the instruction signal from the processing unit via the bus and to perform at least one of the special-function operations in accordance with the instruction signal, thereby generating processed data which is transmitted back to the processing unit via the bus.

According to the present invention, it is possible to facilitate the production of a digital signal processing device having an optimum construction adapted to a specific one of various signal processing applications. Also, it is possible to reduce the cost of the development of an application program which is run on the digital signal processing device. Also, by utilizing the software, it is possible to easily simulate the operation of a digital signal processing device which is modified in accordance with the cost requirement.

BRIEF DESCRIPTION OF THE DRAWINGS

The above and other objects, features and advantages of the present invention will be more apparent from the following detailed description when read in conjunction with the accompanying drawings in which:

FIG. 6 is a diagram showing examples of functional-block control instructions which may be included in an instruction transmitted by the processing unit when it is used for a sound data compression and decompression; and FIGS. 7A and 7B are diagrams showing examples of different instructions which are separately transmitted by the processing unit in another embodiment of the present invention.

DESCRIPTION OF THE PREFERRED EMBODIMENTS

A description will now be given of preferred embodiments of the present invention with reference to the accompanying drawings.

Figure 1:
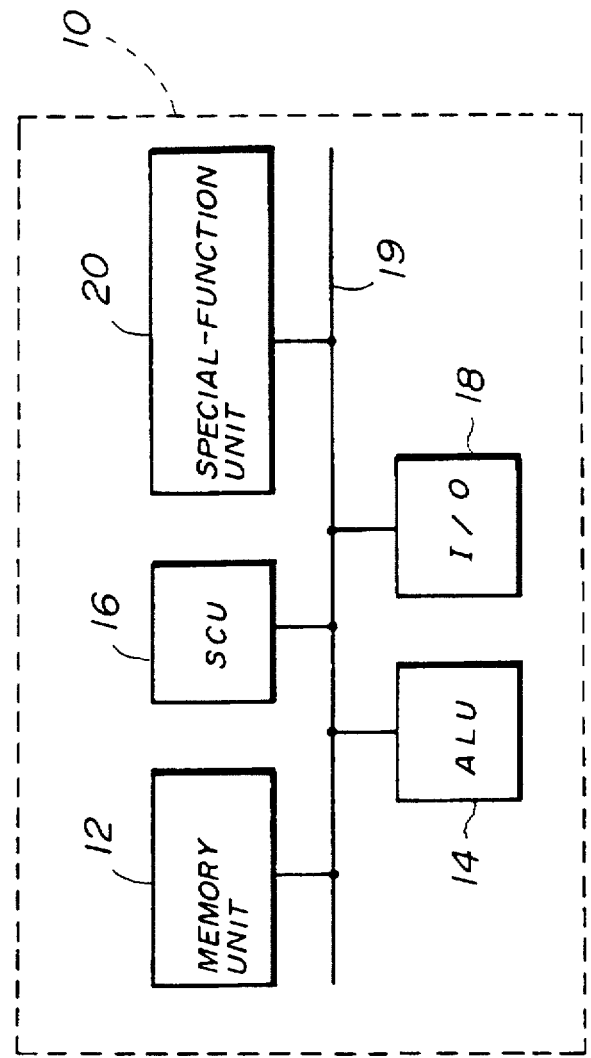
FIG. 1 is a block diagram of a conventional digital signal processor.
Figure 2:
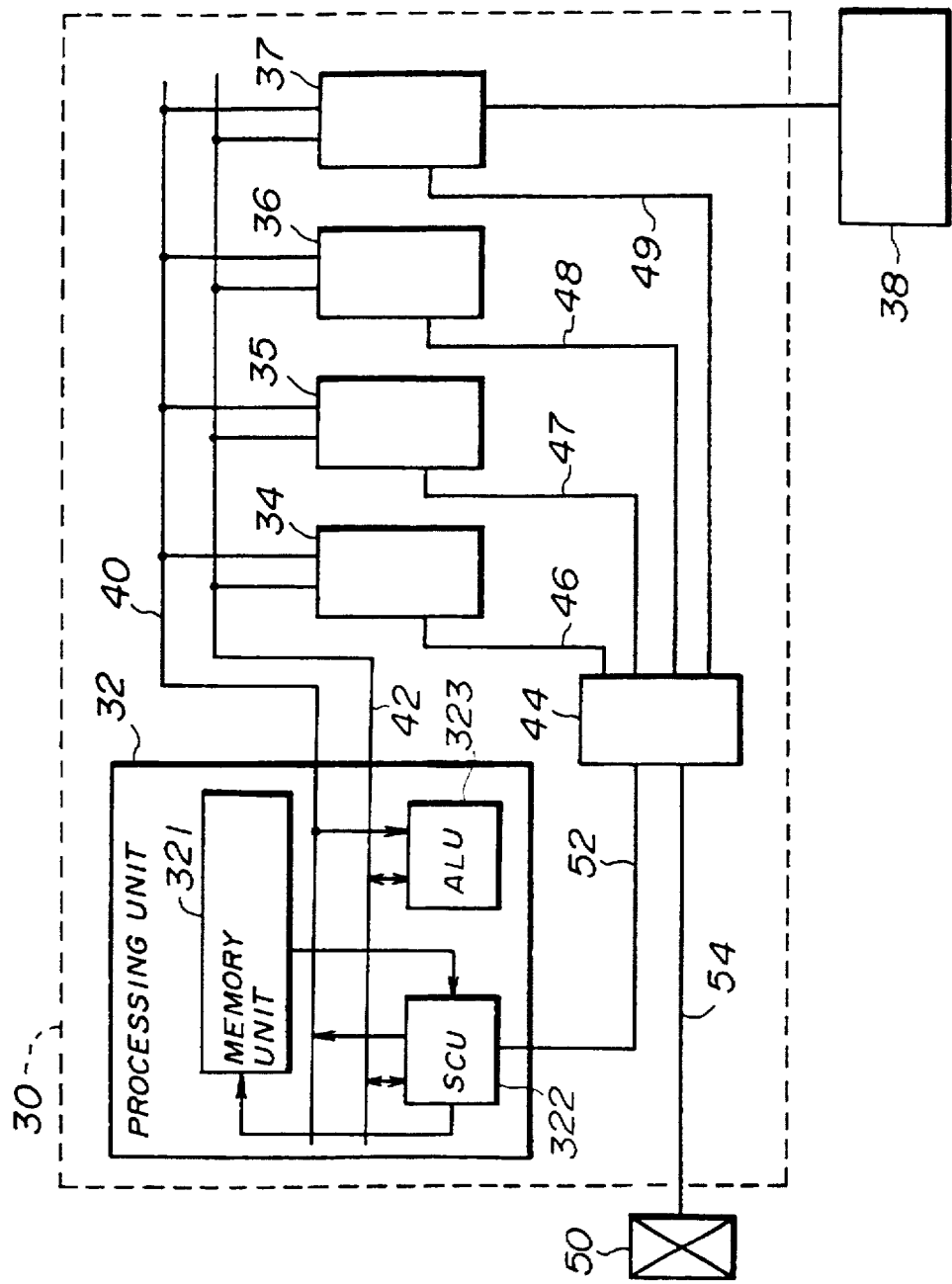
FIG. 2 is a block diagram of a digital signal processing device in one embodiment of the present invention.

FIG. 2 shows a digital signal processing device 30 in the preferred embodiment of the present invention. The digital signal processing device 30 includes a processing unit 32, a plurality of functional blocks 34 through 37, and an external memory unit 38. The functional blocks 34 through 37 are connected in parallel to the processing unit 32. The external memory unit 38 is connected to the functional block 37.

The processing unit 32 includes a memory unit 321, a sequence controller unit (SCU) 322, and an arithmetic and logic unit (ALU) 323. Basic operations, such as multiplication, addition, data transfer and sequence control operations, are performed by these component units of the processing unit 32.

An operation of the digital signal processing device 30 when one of the basic operations is performed by the processing unit 32 will now be described.

The processing unit 32 includes an internal data bus and an internal instruction bus, and the SCU 322 and the ALU 323 are interconnected by each of the internal data bus and the internal instruction bus. The SCU 322 has a first output which is connected to a selecting unit 44 via a signal path 52, and a second output which is connected to an address input of the memory unit 321. The SCU 322 has also an input connected to an output of the memory unit 321. The memory unit 321 stores a plurality of instruction codes at memory addresses, the instruction codes stored therein describing instructions used to execute the basic operations.

When a specific one of the basic operations is performed by the processing unit 32, the SCU 322 transmits an address signal from the second output of the SCU 322 to the memory unit 321, the address signal indicating a specific memory address of the memory unit 321. A specific instruction code read from the memory unit 321 is transferred to the data input of the SCU 322. The SCU 322 decodes the instruction code, received from the memory unit 321, into an instruction, and transmits the instruction to the ALU 323 via the internal instruction bus. Data pieces relating to the instruction are accessible from the ALU 323 to the SCU 322 via the internal data bus, and vice versa. When the ALU 323 receives the instruction from the SCU 322, the ALU performs the specific basic operation according to the instruction, and generates processed data as a result of the execution, and transmits the processed data back to the SCU 322 via the internal data bus.

In addition, in the above-described digital signal processing device 30, special-function operations which are different from the basic operations performed by the processing unit 32 are performed by the functional blocks 34 through 37. The processing unit 32 and the functional blocks 34 through 37 are interconnected by the data bus 40 and the instruction bus 42. The data bus 40 and the instruction bus 42 are connected directly to the internal data bus and the internal instruction bus of the processing unit 32, respectively.

The digital signal processing device 30 further includes the selecting unit 44 which is connected to the first output of the SCU 322 of the processing unit 32 by the signal path 52. The selecting unit 44 is connected to each of the functional blocks 34 through 37 by signal paths 46 through 49, respectively. Also, the selecting unit 44 is connected to an external unit 50 by a signal path 54. The external unit 50 transmits an external status signal to the selecting unit 44, and the SCU 322 transmits an internal status signal to the selecting unit 44, which will be described below.

When a special-function operation is performed on the digital signal processing device 30, at least one of the functional blocks 34 through 37 is selected by the selecting unit 44 by outputting an enable signal to at least one of the functional blocks 34 through 37.

In addition, two or more special-function operations can be selectively performed by the functional blocks 34 through 37 on the digital signal processing device 30. In such a case, the enable signal is transmitted by the selecting unit 44 to two or more functional blocks from among the functional blocks 34 through 37, and the two or more functional blocks are enabled by the enable signal to perform the special-function operations.

The selected functional block inputs data pieces and an instruction supplied from the processing unit 32 via the data bus 40 and the instruction bus 42. The special-function operation mentioned above is performed by the selected functional block according to the input instruction to process the input data. The processed data which is generated as a result of the execution by the selected functional block is transferred from the selected functional block to the processing unit 32 via the data bus 40. These operations are performed by the selected functional block under the control of the processing unit 32.

The enable signals mentioned above are output by the selecting unit 44 to the functional blocks 34 through 37 via the signal paths 46 through 49 when either an internal status signal from the processing unit 32 or an external status signal from the external unit 50 is output to the selecting unit 44.

Figure 3:
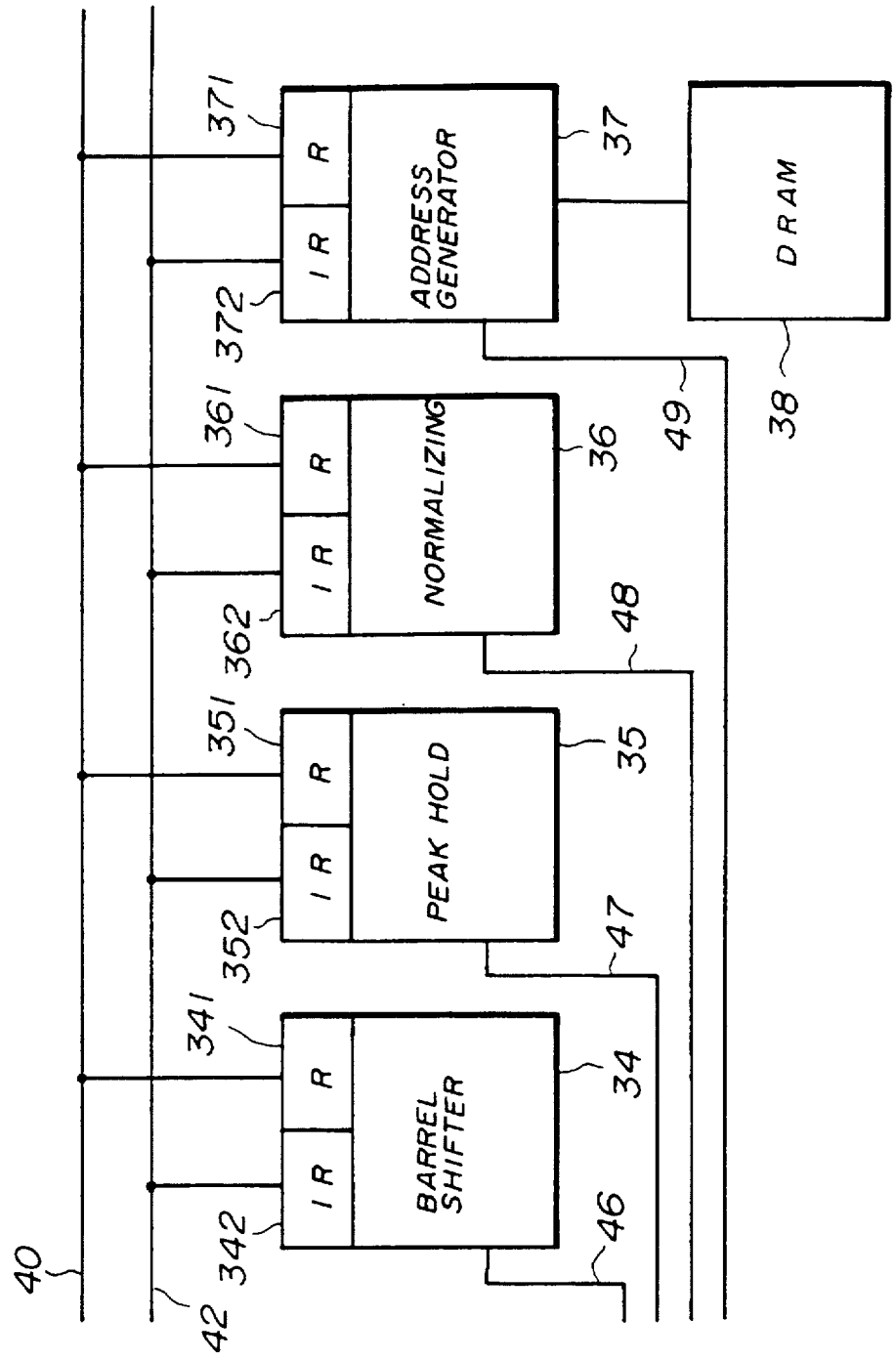
FIG. 3 is a block diagram of functional blocks of the digital signal processing device in FIG. 2.

FIG. 3 shows examples of the functional blocks 34 through 37 which are provided in the digital signal processing device 30 in FIG. 2.

Referring to FIG. 3, a barrel shifter 34, a peak holding unit 35, a normalizing unit 36 and an address generator 37 are connected to the processing unit 32 (not shown in FIG. 3) by the data bus 40 and the instruction bus 42. These functional blocks 34, 35, 36 and 37 respectively include data registers (R) 341, 351, 361 and 371, and instruction registers (IR) 342, 352, 362 and 372.

The input data supplied from the processing unit 32 or the processed data produced by the functional blocks 34–37 is held by the data registers (R) 341–371. The instruction supplied from the processing unit 32 is held by the instruction registers (IR) 342–372.

In FIG. 3, an external dynamic random access memory (DRAM) 38 is connected to the address generator 37. The address generator 37 generates an address signal indicative of a location of the DRAM 38, and allows the processing unit 32 to access the DRAM 38 by using the address signal.

Next, a description will be given of operations of the digital signal processing device 30 in the preferred embodiment of the present invention.

As described above, when special-function operations are performed by any of the functional blocks 34 through 37 on the digital signal processing device 30, the enable signals are output from the selecting unit 44 to such units of the functional blocks 34 through 37, so that such units of the functional blocks 34 through 37 are selected.

Which functional blocks are to be selected depends on an application program to which the digital signal processing device 30 is adapted.

As described above, the enable signals are output by the selecting unit 44 to the functional blocks 34 through 37 via the signal paths 46 through 49 when either the internal status signal from the processing unit 32 (via the signal path 52) or the external status signal from the external unit 50 (via the signal path 54) is output to the selecting unit 44. Therefore, which enable signals are output by the selecting unit 44 depends on the application program to which the digital signal processing device 30 is applied.

For example, when the digital signal processing device 30 is used for an acoustics processing application, it is necessary for the digital signal processing device 30 to control an addressing of the external DRAM 38 only. The DRAM 38 used for the acoustics processing application has a great amount of storage capacity.

In the above example, an enable signal is output by the selecting unit 44 to the address generator 37 via the signal path 49 so that only the address generator 37 is selected from among the functional blocks 34 through 37. The addressing operation is performed by the address generator 37 with the external DRAM 38.

After the enable signal is output by the selecting unit 44 to one (e.g. the address generator 37) of the functional blocks 34-37, the processing unit 32 internally decodes a signal including data and an instruction described by an instruction code to reproduce the original data and instruction, and they are supplied to the selected functional block. The processing unit 32 supplies the data pieces and the instruction to the selected one of the functional blocks 34-37 via the data bus 40 and the instruction bus 42 respectively.

In the selected one of the functional blocks 34-37, the data pieces and the instruction, supplied from the processing unit 32, are held by the data register (R) and the instruction register (IR), respectively. The selected functional block performs a special-function operation in accordance with the instruction held by the instruction register (IR), to process the data held by the data register (R).

After the processing of the data is performed by the selected functional block, the processed data is held by the data register (R) of the selected functional block.

Generally, after all the processed data are held by the respective data registers (R) of the functional blocks which are selected according to the application program, the held processed data are supplied from the selected functional blocks to the processing unit 32 via the data bus 40. The processing unit 32 continues to perform a following processing operation based on the processed data output from the selected functional blocks.

In the above embodiment, the outputting of the enable signals to the functional blocks 34-37 to select any of the functional blocks 34-37 is carried out in accordance with the internal status signal output by the processing unit 32 to the selecting unit 44 via the signal path 52, or the external status signal output by the external unit 50 to the selecting unit 44 via the signal path 54.

Therefore, a determination of the status signal relating to the selection of the functional blocks 34-37 makes it possible that the digital signal processing device 30 of the present invention is adapted to various kinds of application software.

When an application program to which the digital signal processing device 30 is adapted is developed for the production, the determination of the status signal can be freely done without restriction of the fixed hardware, and the cost of the manufacture can be reduced to be as small as possible.

Figure 4:
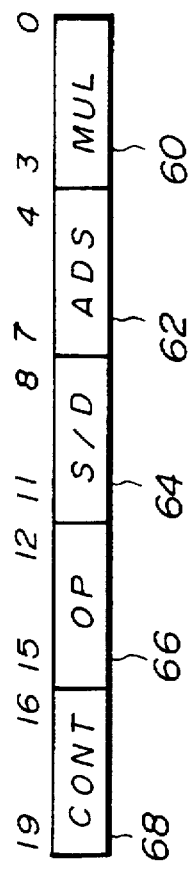
FIG. 4 is a diagram showing an example of an instruction which is transmitted by a processing unit of the digital signal processing device in FIG. 2.

FIG. 4 shows an example of an instruction which is transmitted by the processing unit 32 to the operational blocks 34 through 37.

Referring to FIG. 4, the number of bits (the code length) included in the instruction code is 20 bits. The instruction code contains various code elements in instruction areas 60, 62, 64, 66, and 68. The code elements respectively describe various control instructions for executing different tasks.

More specifically, the code element in the instruction area 60 (the 0-3rd bits) is a multiplication (MUL), the code element in the instruction area 62 (the 4-7th bits) is an addition or subtraction (ADS), the code element in the instruction area 64 (the 8-11th bits) is a source and destination address (S/D), the code element in the instruction area 66 (the 12-15th bits) is a sequence control operation (OP), and the code element in the instruction area 68 (the 16-19th bits) is a functional-block control instruction (CONT).

In the above-described embodiment, a data signal including the data pieces from the processing unit 32 is supplied to the functional blocks 34-37 via the data bus 40, and an instruction signal including the instruction from the processing unit 32 is supplied to the functional blocks 34-37 via the instruction bus 42. The instruction signal output from the processing unit 32 can be held by the instruction register (IR) of each of the functional blocks 34-37, and the data signal output from the processing unit 32 can be held by the data register of each of the functional blocks 34-37.

It is necessary that a data structure of each instruction included in the instruction signal held by each of the instruction resisters (IR) 342, 352, 362 and 372 is in accordance with a data structure of each instruction included in the instruction code shown in FIG. 4.

In the above-described embodiment, the functional-block control instruction (CONT) included in the instruction area 68 is supplied to only one of the functional blocks 34-37 to perform its special-function operation.

Figure 5:
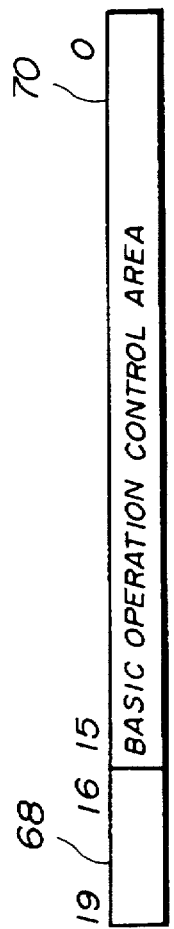
FIG. 5 is a diagram showing examples of functional-block control instructions which may be included in an instruction transmitted by the processing unit when it is used for an acoustics processing application.

FIG. 5 shows examples of functional-block control instructions included in the instruction area 68 (the 16-19th bits) of an instruction which is transmitted by the processing unit 32 when the digital signal processing device 30 is used for the acoustics processing application. Similarly to the data structure of the instruction in FIG. 4, the instruction in FIG. 5 has a 20-bit code length and it includes the instruction area 68 (the 16-19th bits) and a basic-operation control area 70 (the 0-15th bits).

When the digital signal processing device 30 is used for the acoustics processing application, one of the examples of the functional-block control instructions, shown in FIG. 5, is transmitted by the processing unit 32 to the address generator 37 only. In the acoustics processing application, the digital signal processing device 30, shown in FIG. 2, is required to control the addressing of the DRAM 38 only. Thus, the address generator 37 is selected by the selecting unit 44 from among the functional blocks 34-37 under the control of the processing unit 32.

It is also conceivable to use the digital signal processing device 30 for a sound data compression and decompression. When the digital signal processing device 30 is used for the sound data compression and decompression, the device 30 is required to control the operations of the barrel shifter 34, the peak holding unit 35, and the normalizing unit 36.

Thus, the barrel shifter 34, the peak holding unit 35, and the normalizing unit 36 are selected from among the functional blocks 34-37 by the selecting unit 44 under the control of the processing unit 32.

FIG. 6 shows examples of functional-block control instructions which may be included in the instruction area 68

(the 16–19th bits) of an instruction transmitted by the processing unit 32 when the digital signal processing device 30 is used for the sound data compression and decompression.

Similarly to the data structure of the instruction in FIG. 4, the instruction in FIG. 6 has a 20-bit code length and it includes the instruction area 68 and the basic-operation control area 70. The basic instructions in the basic-operation control area 70 as shown in FIGS. 5 and 6 are the same, and no modifications are needed.

However, the functional-block control instruction included in the instruction area 68, shown in FIG. 6, is transmitted by the processing unit 32 to one of the units 34, 35 and 36 for the sound data compression and decompression. In other words, the instruction area 68 of the instruction transmitted by the processing unit 32 is shared by the units 34, 35 and 36 to recognize a functional-block control instruction output from the processing unit 32. The operations of the barrel shifting, the peak holding, and the normalizing are performed by the units 34, 35 and 36 in common according to the functional-block control instruction included in the instruction area 68.

In the above-described embodiment, any of the functional blocks 34–37 can be selected in accordance with a specific signal processing application and any of the functional-block control instructions, as shown in FIGS. 5 and 6, can be included in the instruction area 68 of an instruction transmitted by the processing unit 32. Accordingly, the digital signal processing device 30 can be adapted to various kinds of signal processing applications, and the quantity of modifications to the application program can be made as small as possible.

As shown in FIGS. 5 and 6, a single instruction transmitted by the processing unit 32 includes the instruction area 68 containing a functional-block control instruction, and the instruction area 70 containing a basic-operation control instruction. Therefore, the basic operation and the special-function operation can be performed by the processing unit 32 and one of the functional blocks 34–37 by parallel processing.

In addition, any of the various functional-block control instructions for the various functional blocks can be included in the common instruction area of a single instruction transmitted by the processing unit 32, and the cost of application software development can be remarkably reduced.

In the above embodiment, four functional blocks 34–37 are provided. However, the number of functional blocks provided in the digital signal processing device 30 can be increased to a reasonably larger number. Thus, the present invention can be adapted to various kinds of signal processing applications.

When many special-function operations must be performed by the functional blocks 34–37 in a certain application, there is a case in which all the kinds of functional-block control instructions cannot be included in the instruction area 68 of the instruction transmitted by the processing unit 32 because of the limited code length of the instruction area 68. In such a case, it is preferable to use time division processing to allow switching of two or more instruction areas in which different functional-block control instructions are included.

In the above case, the selection of the functional blocks is carried out by a determination of internal flags in the digital signal processing device. The time division processing which allows the switching of the instruction areas can be performed by an application program.

When the development of the application program is completed, some functional blocks of the digital signal processing device 30 which can be effectively used with the application program are determined and established. In such a case, transmitting an external status signal from the external unit 50 to the selecting unit 44 makes it possible to select the functional blocks in the digital signal processing device 30. The power-on and reset operations of the functional blocks enable the functional blocks to be automatically selected. Difficulty in the development of the application program can be reduced.

In the above-described embodiment, the instruction area 68 containing a functional-block control instruction and the instruction area 70 containing a basic-operation control instruction are included in a single instruction transmitted by the processing unit 32.

According to the concept of the present invention, it is also possible that different instructions one of which contains a functional-block control instruction and the other containing a basic-operation control instruction are separately transmitted by the processing unit 32 to the functional blocks 32 through 37.

FIGS. 7A and 7B show examples of such instructions separately transmitted by the processing unit 32 in the digital signal processing device 30 in another embodiment of the present invention.

In FIG. 7A, there is shown an instruction which is transmitted by the processing unit 32 and includes a flag area (the 18–19th bits) containing a flag and an instruction area (the 0–17th bits) containing a basic-operation control instruction code.

In FIG. 7B, there is shown an instruction which is transmitted by the processing unit 32 and includes a flag area (the 18–19th bits) containing a flag, a block selection area (the 14–17th bits) containing a block selection indication, and an instruction area (the 0–13th bits) containing a functional-block control instruction code.

The distinction between the two different instructions is made by reading the flag included in each instruction. When the instruction containing a functional-block control instruction code, as shown in FIG. 7B, is transmitted by the processing unit 32, the functional-block control instruction code is internally or externally decoded by the processing unit 32, and the decoded instruction is transferred to the functional blocks 34–37 via the instruction bus 42

In the above-described embodiment, the number of functional-block control instructions which can be included in the instruction area is increased because the code length of the functional-block control area in FIG. 7B is greater than the code length of the instruction area 68 in FIGS. 5 and 6.

On the digital signal processing device 30 in the foregoing embodiment, the special-function operations which are different from the basic operations are performed by the functional blocks 34–37. According to the concept of the present invention, it is possible that a programmable logic device (PLD) or a programmable logic cell array (PLCA) can be used instead of the functional blocks 34–37.

When the PLD is used instead, the selection of the functional blocks, which perform the special-function operations, can be made by using an application program. In other words, the formation of the functional blocks in the PLD can be automatically performed in accordance with a specific signal processing application. Thus, it is possible that the digital signal processing device is adapted to various kinds of application software. Also, it is possible that the hardware of the digital signal processing device be optimized for a specific signal processing application.

Further, the present invention is not limited to the above-described embodiments, and various variations and modifications may be made without departing from the scope of the present invention.

What is claimed is:

1. A digital signal processing device comprising:

processing means for performing basic operations including multiplication, addition, data transfer and sequence control operations and for transmitting an instruction signal and a data signal, whereby said instruction signal includes an instruction code, when predetermined special-function operations different from said basic operations are to be performed;

a plurality of functional block means for performing said predetermined specialfunction operations in accordance with the instruction code of said instruction signal outputted by said processing means and for generating and outputting processed data to said processing means;

bus means for carrying the instruction signal and the data signal outputted by the processing means to at least one of said plurality of functional block means and for carrying the processed data of at least one of said plurality of functional block means to the processing means; and block selecting means, connected between said plurality of functional block means and said processing means, responsive to a status signal, for selecting at least one of said plurality of functional block means and for transmitting an enable signal to at least one of said plurality of functional block means enabling said at least one of said plurality of functional block means to receive the instruction signal and the data signal outputted by the processing means via said bus means and to perform at least one of the predetermined special-function operations in accordance with the instruction code of the instruction signal.

2. The digital signal processing device according to claim 1, wherein said block selecting means receives either the status signal transmitted by said processing means or an external status signal transmitted by an external unit, said block selecting means selecting at least one of said functional block means in accordance with either the status signal or the external status signal.

3. The digital signal processing device according to claim 1, wherein, when the instruction signal is transmitted by said processing means, the instruction indicated by said instruction signal includes a functional-block control instruction contained in an instruction area of the instruction and a basic-operation control instruction contained in another instruction area of the instruction.

4. The digital signal processing device according to claim 1, wherein, when the instruction signal is transmitted by said processing means to one of said functional block means, the instruction indicated by said instruction signal includes a functional-block control instruction contained in an instruction area of the instruction, wherein said one of said functional block means is enabled by said instruction signal to perform a special-function operation in accordance with said functional-block control instruction.

5. The digital signal processing device according to claim 1, wherein, when the instruction signal is transmitted by said processing means to two or more of said functional block means, the instruction indicated by said instruction signal includes a functional-block control instruction contained in an instruction area of the instruction, wherein said functional-block control instruction is shared by said two or more of said functional block means to perform two or more specialfunction operations of different kinds.

6. The digital signal processing device according to claim 1, wherein said plurality of functional block means are included in a programmable logic device, and at least one functional block means in said programmable logic device is selected by said block selecting means in accordance with a determination of the status signal which is made in a program.

7. The digital signal processing device according to claim 1, wherein each of said functional block means has an input for inputting the enable signal transmitted by said block selecting means.

8. The digital signal processing device according to claim 1, wherein each of said functional block means includes a data register which retains data pieces supplied from the processing means and an instruction register which retains the instruction transmitted by the processing means.

9. A digital signal processing device comprising:

a processing unit for performing basic operations including multiplication, addition, data transfer and sequence control operations and for transmitting an instruction signal and a data signal, whereby said instruction signal includes an instruction code, when predetermined special-function operations different from said basic operations are to be performed;

a plurality of functional block units for performing said predetermined specialfunction operations in accordance with the instruction code of said instruction signal outputted by said processing unit and for generating and outputting processed data to said processing unit;

a bus for carrying the instruction signal and the data signal outputted by the processing unit to at least one of said plurality of functional block units and for carrying the processed data of at least one of said plurality of functional block units to the processing unit; and a block selecting unit, connected between said plurality of functional block units and said processing unit responsive to a status signal, for selecting at least one of said plurality of functional block units and for transmitting an enable signal to at least one of said plurality of functional block units enabling said at least one of said plurality of functional block units to receive the instruction signal and the data signal outputted by the processing unit via said bus and to perform at least one of the predetermined special-function operations in accordance with the instruction code of the instruction signal.

* * * * *